(12) United States Patent
Bhatia et al.

(10) Patent No.: US 9,183,564 B2
(45) Date of Patent: Nov. 10, 2015

(54) FRAMEWORK FOR MARKETPLACE ANALYSIS

(75) Inventors: Tarun Bhatia, Oak Park, CA (US); Prasad Chalasani, New York, NY (US); Rohit Chandra, Los Altos, CA (US)

(73) Assignee: YAHOO! INC., Sunnyvale, CA (US)

( * ) Notice: Subject to any disclaimer, the term of this patent is extended or adjusted under 35 U.S.C. 154(b) by 134 days.

(21) Appl. No.: 13/538,902

(22) Filed: Jun. 29, 2012

(65) Prior Publication Data

US 2014/0006073 A1 Jan. 2, 2014

(51) Int. Cl.
*G06F 17/00* (2006.01)
*G06Q 10/06* (2012.01)
*G06Q 30/02* (2012.01)

(52) U.S. Cl.
CPC .................................. *G06Q 30/0201* (2013.01)

(58) Field of Classification Search
CPC .......... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20
USPC .............. 705/7.11–7.42, 14.13, 14.23, 14.41, 705/26.1; 714/6.1
See application file for complete search history.

(56) References Cited

U.S. PATENT DOCUMENTS

| | | | |
|---|---|---|---|
| 7,434,096 B2 * | 10/2008 | Callaway et al. | 714/6.1 |
| 7,474,433 B2 * | 1/2009 | Snyder | 358/1.15 |
| 2002/0099580 A1 * | 7/2002 | Eicher et al. | 705/7 |
| 2003/0130983 A1 * | 7/2003 | Rebane | 707/1 |
| 2005/0010475 A1 * | 1/2005 | Perkowski et al. | 705/14 |
| 2006/0282302 A1 * | 12/2006 | Hussain | 705/9 |

* cited by examiner

*Primary Examiner* — Sujay Koneru
*Assistant Examiner* — Uche Byrd
(74) *Attorney, Agent, or Firm* — James J. DeCarlo; Greenberg Traurig, LLP (57) ABSTRACT

A marketplace diagnostics framework for analyzing and managing online marketplaces.

20 Claims, 3 Drawing Sheets

FRAMEWORK FOR MARKETPLACE ANALYSIS

BACKGROUND

1. Field

Example embodiments relate to marketplace analysis.

2. Description of the Related Art

Online marketplaces have been emerging for the last two decades. Online marketplaces, such as eBay, Amazon, and Yahoo have provided an arena to purchase and advertise various products and services. For example, billions of dollars are now being spent per year on online advertising, and there seems to be no end to the growth of the Internet or online advertising.

Although companies have achieved great success through online marketplaces, the scale of large online marketplaces makes them difficult to analyze and manage efficiently. For example, one tradeoff can be the complexity of determining pricing and potential revenue derived from an online advertisement. Another complexity can be understanding a structure of a marketplace and how various marketplaces may be interrelated. This is especially difficult, considering structure of an online marketplace may constantly change in unpredictable ways. Because of the abovementioned complexities and other issues that make analyzing and managing of online marketplaces difficult, users and operators of such marketplaces would benefit from an effective framework for analyzing and managing online marketplaces.

SUMMARY

A system, such as a marketplace diagnostics framework (MDF), for managing an online marketplace that may be configured to identify a fault diagnosis technique for an online marketplace, where the fault diagnosis technique may include procedures and measurements for diagnosing an issue in the online marketplace. Prior to the identification of the fault diagnosis technique, the system may be configured to search for an appropriate fault diagnosis technique for a particular online marketplace.

The system may also be configured to evaluate the procedures and the measurements of the fault diagnosis technique for their effectiveness in diagnosing an issue in the online marketplace. Further included may be prioritizing the procedures and the measurements of the fault diagnosis technique according to at least the evaluation of the procedures and the measurements. Also included may be executing at least one of the procedures and the measurements of the fault diagnosis technique according to the prioritization of the procedures and the measurements.

The system may also be configured to: store diagnostic information resulting from the execution of the at least one of the procedures and the measurements; generate a remedy according to at least the diagnostic information; and execute the remedy. Furthermore, the system may be configured to evaluate remediation information resulting from the execution of the remedy. Further included may be storing the remediation information and the evaluation of the remediation information; and then communicating the remediation information and the evaluation of the remediation information to a user or operator of the online marketplace, the system, or another system.

BRIEF DESCRIPTION OF THE DRAWINGS

The system may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION OF EXAMPLE EMBODIMENTS

The scale of online marketplaces makes such marketplaces difficult to analyze and manage efficiently. Further, the scale makes remedying issues in an online marketplace problematic. The analysis and management of an online marketplace is difficult because online marketplaces typically change unpredictably, and sometimes the structure of the online marketplace is not well understood. Using one analogy, an online marketplace may be as complex as a patient's anatomy and physiology. Therefore, a system analogous to a system for diagnosing a patient may be beneficial to parties that desire to analyze and manage an online marketplace. Further, it may be beneficial if such a system is automated via a computer information system, for example.

Described herein is a system, such as a marketplace diagnostics framework (also referred to herein as the MDF), for analyzing and managing an online marketplace. Further, the system provides for determining procedures and measurements for diagnosing issues in an online marketplace, and for determining remedies for, at least, alleviating the issues.

In one embodiment, a computer implementing the MDF may perform a method for analyzing and managing an online marketplace. The method for analyzing and managing an online marketplace may include identifying a fault diagnosis technique for an online marketplace, where the fault diagnosis technique may include procedures and measurements for diagnosing an issue in the online marketplace. Prior to the identification of the fault diagnosis technique, the method may include searching for an appropriate fault diagnosis technique for a particular online marketplace. The method may also include evaluating the procedures and the measurements of the fault diagnosis technique for their effectiveness in diagnosing an issue in the online marketplace. Further included may be prioritizing the procedures and the measurements of the fault diagnosis technique according to at least the evaluation of the procedures and the measurements. Also included may be executing at least one of the procedures and the measurements of the fault diagnosis technique according to the prioritization of the procedures and the measurements. The method may also include storing diagnostic information resulting from the execution of the at least one of the procedures and the measurements; generating a remedy according to at least the diagnostic information; and executing the remedy.

Furthermore, the method may include evaluating remediation information resulting from the execution of the remedy. Subsequently, the method may include storing the remediation information and the evaluation of the remediation information; and then communicating the remediation information and the evaluation of the remediation information to a user or an operator of the online marketplace or the MDF, the MDF, another system, or another computer, for example. In one embodiment, feedback may be provided to the MDF, aspects of the MDF, users of the MDF, and/or other systems besides the MDF. Such feedback may facilitate automation of control of the marketplace and/or the MDF.

In one embodiment, the prioritization of the procedures and the measurements includes determining a most effective procedure, measurement, and/or indicator for determining an issue occurring in the online marketplace, and ranking the most effective procedure, measurement, and/or indicator higher than other procedures, measurements, and/or indicators of the fault diagnosis technique, respectively.

Also, in one embodiment, at least one of the procedures of the fault diagnosis technique may include at least one of the measurements of the fault diagnosis technique, and at least one of the measurements of the fault diagnosis technique may include a measurement of an indicator for determining an issue occurring in the online marketplace and/or a system related to the online marketplace. Further, at least one of the procedures of the fault diagnosis technique may include statistical modeling for at least one of the measurements of the fault diagnosis technique. Also, a procedure of the fault diagnosis technique may include a procedure for classifying an overall health state of the online marketplace and/or a procedure for classifying a diagnosed issue with respect to an effect of the diagnosed issue on the online marketplace. For example, the procedure for classifying the overall health state of the online marketplace may include measuring profitability of the online marketplace.

The measurements of the fault diagnosis technique may also include a measurement of liquidity in the online marketplace, a measurement of demand for products and services distributed in the online marketplace, and a measurement of an amount of transactions or subscriptions in the online marketplace, for example.

Furthermore, in another embodiment, the executing at least one of the procedures and the measurements of the fault diagnosis technique may include determining cause of an issue. The determination of the cause of an issue in the online marketplace may be at least based on an evaluation of historical information regarding the online marketplace, the issue, and/or a related issue or marketplace, for example.

In one embodiment, the MDF may classify a marketplace with respect to its current health state (e.g., with respect to its current effectiveness, efficiency, profitability, or liquidity). Also, the MDF may classify a marketplace with respect to its health state based on transactions within a period of time. The MDF may also quantify risk and impact of a marketplace within its current health state, or with respect to a period of time and/or quantity of transactions within that period of time. These quantifications may facilitate prioritization of diagnostic procedures, measurements, and/or indicators of a fault diagnosis technique.

Further, the MDF may select an action (e.g., a remedy) associated with a diagnosis, for example, to improve the state of a marketplace. The MDF may also provide to a user, another system, or itself, target levels, vital measurements, and reports on progress of actions to improve the state of a marketplace. Furthermore, the aforementioned may be provided via fault diagnosis and known probabilistic models.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

The terminology used in the specification is for the purpose of describing particular embodiments only and is not intended to be limiting of example embodiments of the invention. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Likewise, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof, and in the following description, the same reference numerals denote the same elements.

Now, in order to more specifically describe example embodiments of the present invention, various embodiments of the present invention will be described in detail with reference to the attached drawings. However, the present invention is not limited to the example embodiments, but may be embodied in various forms. In addition, the detailed is not intended as an extensive or detailed discussion of known concepts. As such, details that are known generally to those of ordinary skill in the relevant art may have been omitted or may be handled in summary fashion.

While example embodiments have been particularly shown and described with reference to FIGS. 1-3 it will be understood by one of ordinary skill in the art that various changes in form and details may be made therein without departing from the spirit and scope of example embodiments, as defined by the following claims.

Figure 1:
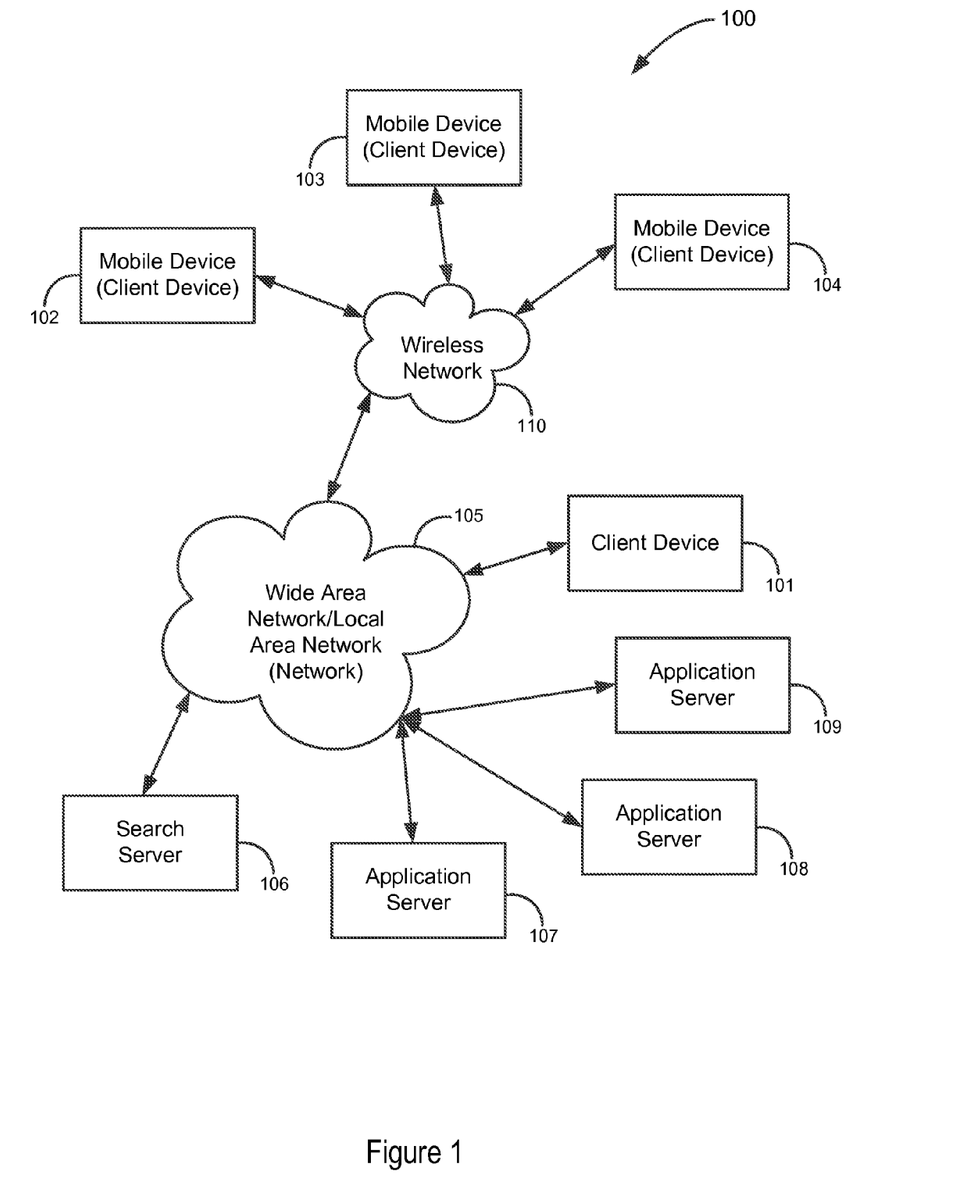
FIG. 1 illustrates a block diagram of one embodiment of a network that can implement one embodiment of a marketplace diagnostics framework (MDF) for managing and analyzing an online marketplace.

FIG. 1 illustrates a block diagram of one embodiment of a network 100 that can implement one embodiment of the MDF. As shown, FIG. 1, for example, the network 100 includes a variety of networks, such as local area local area network (LAN)/wide area network (WAN) 105 and wireless network 110, a variety of devices, such as client device 101 and mobile devices 102-104, and a variety of servers, such as application servers 107-109 and search server 106.

A network, such as the network 100, may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network, such as wireless network 110, may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Figure 2:
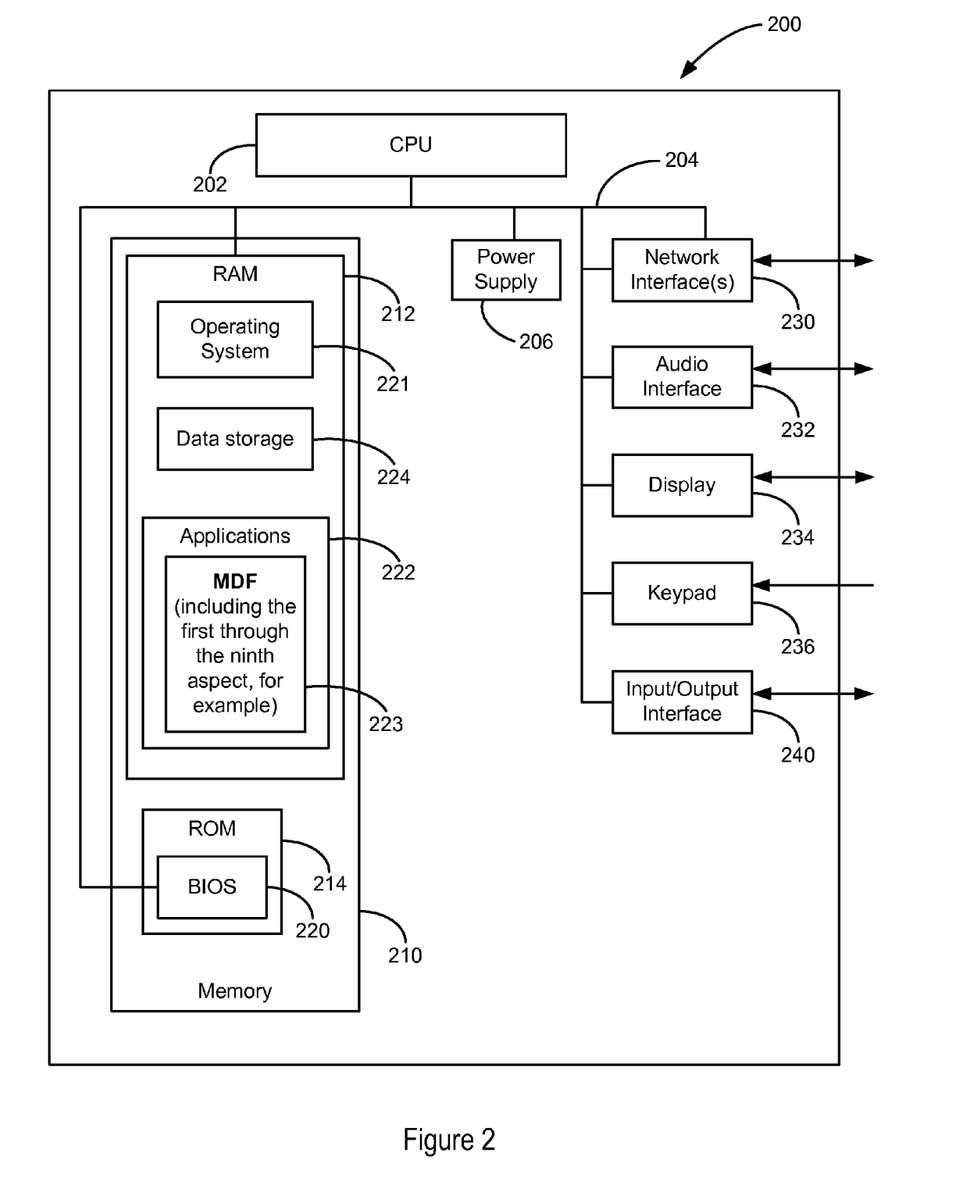
FIG. 2 illustrates a block diagram of one embodiment of an electronic device that can implement an aspect of one embodiment of an MDF.

FIG. 2 illustrates a block diagram of one embodiment of an electronic device 200 that can implement an aspect of one embodiment of the MDF. Instances of the electronic device 200 may include servers, such as servers 106-109, and client devices, such as client devices 101-104. A client device may be a desktop computer, a laptop computer, a tablet, or a smartphone, for example. In general, the electronic device 200 can include a processor 202, memory 210, a power supply 206, and input/output components, such as network interface(s) 230, an audio interface 232, a display 234, a key pad or keyboard 236, an input/output interface 240, and a communication bus 204 that connects the aforementioned elements of the electronic device. The network interfaces 230 can include a receiver and a transmitter (or a transceiver), and an antenna for wireless communications. The processor 202 can be one or more of any type of processing device, such as a central processing unit (CPU). Also, for example, the processor 202 can be central processing logic; central processing logic includes hardware, firmware, software and/or combinations of each to perform a function(s) or an action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software. The memory 210, which can include RAM 212 or ROM 214, can be enabled by one or more of any type of memory device, such as a primary (directly accessible by the CPU) and/or a secondary (indirectly accessible by the CPU) storage device (e.g., flash memory, magnetic disk, optical disk). The RAM can include an operating system 221, data storage 224, and applications 222, such as an embodiment the MDF 223. Further description of operation of one embodiment of the MDF 223 will be provided below in conjunction with FIG. 3. The ROM can include BIOS 220 of the electronic device 200. The power supply 206 contains one or more power components, and facilitates supply and management of power to the electronic device 200. The input/output components can include any interfaces for facilitating communication between any components of the electronic device 200, components of external devices (such as components of other devices of the network 100), and end users. For example, such components can include a network card that is an integration of a receiver, a transmitter, and one or more I/O interfaces. A network card, for example, can facilitate wired or wireless communication with other devices of a network. In cases of wireless communication, an antenna can facilitate such communication. Also, the I/O interfaces, can include user interfaces such as monitors, keyboards, touchscreens, microphones, and speakers. Further, some of the I/O interfaces and the bus 204 can facilitate communication between components of the electronic device 200, and in one embodiment can ease processing performed by the processor 202.

Where the electronic device 200 is a client device, it can include a computing device capable of sending or receiving signals, such as via a wired or a wireless network. A client device may, for example, include a desktop computer or a portable device, such as a cellular phone telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Also, a client device may vary in terms of capabilities or features. Claimed subject matter is intended to cover a wide range of potential variations. For example, a cell phone embodiment may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch sensitive color 2D or 3D display, for example.

Further, a client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages regarding operation or configuration of the MDF. A client device may also include or execute an application to communicate content related to the MDF, such as, for example, textual content, multimedia content, or the like. A client device may also include or execute an application to perform a variety of possible tasks, such as browsing, searching, or analyzing forms of content related to the MDF.

Where the electronic device 200 is a server, it can include a computing device that is capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Further, a server may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. Particularly, the server may be an application server that includes a configuration to provide an application, such as one embodiment of the MDF, via a network to another device. Also, an application server may, for example, host a web site that can provide a user interface for one embodiment of the MDF.

Further, an application server may provide a variety of services that include web services, third-party services, audio services, video services, email services, instant messaging (IM) services, SMS services, MMS services, FTP services, voice over IP (VoIP) services, calendaring services, photo services, or the like, all of which may work in conjunction with the MDF. Examples of content provide by the above-mentioned applications, including one embodiment of the MDF, may include text, images, audio, video, or the like, which may be processed in the form of physical signals, such as electrical signals, for example, or may be stored in memory, as physical states, for example.

Figure 3:
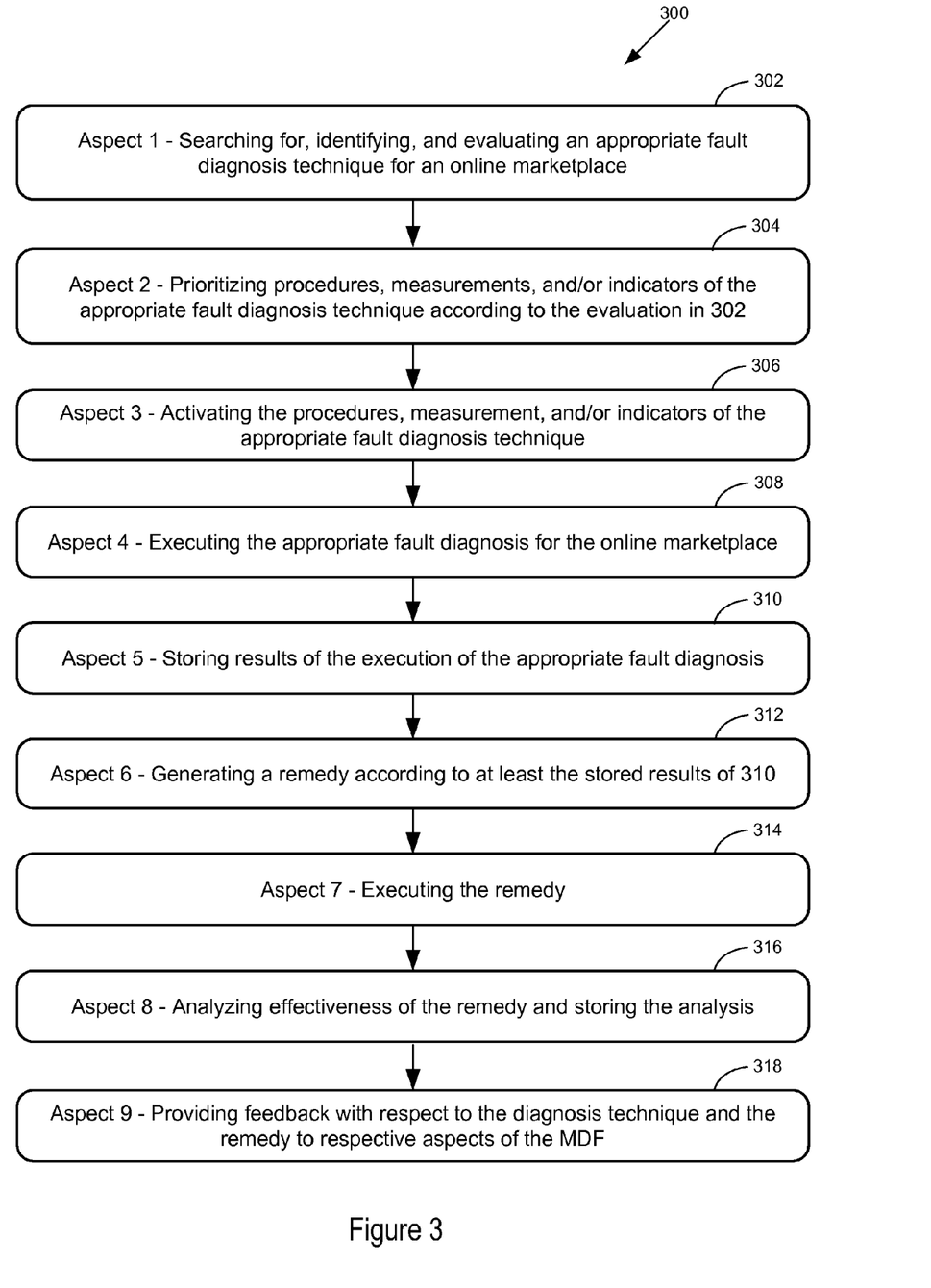
FIG. 3 illustrates a flowchart of an example method that can be performed by an electronic device, such an application server or the device of FIG. 2.

FIG. 3 illustrates a flowchart of a method performed by an electronic device, such as a computer, implementing an example embodiment of the MDF (method 300). In short, the method 300 may analyze and manage an online marketplace; and besides a computer, the method may be performed by a variety of electronic devices, such an application server or, in general, the device of FIG. 2. Further, in one embodiment, a processor (e.g., the processor 202) can perform the method 300 by executing processing device readable instructions encoded in memory (e.g., the memory 210). In such an embodiment, the instructions encoded in memory may include example aspects of the MDF mentioned below.

The method 300 begins with a first aspect of the MDF searching for, identifying, and evaluating an appropriate fault diagnosis technique for an online marketplace (at block 302). A fault diagnosis technique may include various procedures, measurements, and indicators for determining health of a marketplace and diagnosing issues with respect to health of a marketplace. Further, the fault diagnosis technique may include use of various statistical models, such as Bayesian Nets and Markov Processes. These and other possible statistical models may be part of one or more analytics libraries, for example.

Further, in performing method 300, the MDF may initiate the method with respect to a set of known features, factors, and states related to the MDF-managed online marketplace. Known features may include profit margins and liquidity measurements, for example.

The method 300 then with a second aspect of the MDF, prioritizes procedures, measurements, and/or indicators of the appropriate fault diagnosis technique according to the evaluation at 302 (at block 304); and a third aspect activates the procedures and/or the measurements of the appropriate fault diagnosis technique (at block 306). For example, the second aspect may determine critical indicators for determining issues or the overall health of a marketplace. Further, the second aspect may then rank these indicators, and procedures and measurements for identifying and measuring such indicators, by their effectiveness and/or efficiency, for example. The procedures may include procedures for classifying issues and the overall health state of the marketplace. For example, various measurements can be made in addition to standard techniques, and their metrics may be combined in an analysis of the marketplace. Examples of measurements may include measurements of indicators, such as liquidity of the marketplace, demand for products and services distributed in the marketplace, and/or prices of such products and services, all of which may be critical indicators. The measurements may also include or relate to measurements of other indicators, which may be critical indicators too, such as an amount of transactions or subscriptions in a marketplace, and measurements regarding efficiency of clearance of surplus products and services. For example, a measurement may include tracking fulfillment of products for sale online via an online advertising link.

Measurements may also include measurements of subscription rates, liquidity, monetization yield for sellers (or publishers) and/or network of sellers, quality of demand fulfillment, quality of matching, and end user activity for long and/or short term engagements. Measurements of subscription rates may include measurements of supply by sellers and demand by buyers in the marketplace. This measurement may include measurements of committed inventory from sellers or spending by buyers, for example. Measurements of liquidity may include measurements of reliability and frequency of transactions in the marketplace, which may be indicated by volume of transactions and speed of these transactions, for example. Measurements of monetization yield for sellers may include measurements of variance in rates controlled by the marketplace and rates controlled by alternative marketplaces. Measurements of quality of demand fulfillment may include inquiring about allocation of ad inventory, price paid with respect to buyer expectations, and value as indicated in a purchase, for example. Measurements of quality of matching may include measuring appropriate distance metrics with respect to a space of subscribed demand and classified inventory. Measurements of end user activity for long and/or short term engagements may include measurements of session length, visitation frequency, depth of services invoked, and footprints of data generated within a network. This may be measured to monitor impact of matching inventory supply and advertising demand, for example.

With respect to classifying issues and the overall health state of the marketplace, classifying a condition of a marketplace may include identifying the most relevant states of an online marketplace. In other words, the states that have the most material impact on profit, demand, or liquidity, for example. Such identifying may include unstructured learning (e.g., non-parametric clustering, or infinite mixture models) to determine an appropriate amount of states to consider, and to identify the states in particular.

In one embodiment, once sufficient factors and conditions are identified, the identification and prioritization of an appropriate fault diagnosis technique and aspects of the technique can utilize supervised learning to build classification models for assigning a health state to an online marketplace or an aspect of the marketplace. Also, the MDF can utilize Bayesian Nets and/or Markov Processes for example, to determine casual influence flows and independency structures inherent in various factors and conditions. With results of such modeling, as well as other techniques described herein, the MDF may identify value in a new feature or aspect of an online marketplace. Additionally, diagnosing the new feature may be prioritized over the diagnosis of other features in the marketplace.

In supervised learning, a dataset containing pre-classified objects may be provided to aide in model generation. A resulting model may then be used to classify subsequent objects, such as subsequent aspects and states of a marketplace. In contrast, un-supervised learning does not use known information on pre-classified objects.

The method 300 then with a fourth aspect of the MDF performs the appropriate fault diagnosis for the online marketplace (at block 308). Performing a fault diagnosis technique may include identifying or determining the nature and/or cause of an issue in an online marketplace, such as an error or inefficiency in the marketplace. The issue may be diagnosed by the fourth aspect of the MDF through an evaluation of historical information regarding the marketplace, the issue, and/or related marketplaces or issues. The diagnosis may also include an examination of an online marketplace with respect to aspects of the marketplace related to the issue. Also, a diagnosis may include a comparison of results of an examination of an online marketplace and the evaluation of respective historical information.

For example, the fault diagnosis technique may identify latencies in an online marketplace (or internet service for example). These latencies may then be correlated to overall health of the online marketplace, where the correlations may be based on historical information gathered from previously ran fault diagnosis, for example. Further, these latencies, for example, can facilitate determining the nature and cause of one or more issues in an online marketplace, respectively. Also, such a determination may be based on historical information, for example; and such historical information may be stored in a data repository (e.g., relational database) of the MDF, for example. Also, the fourth aspect may run a fault diagnosis technique or aspects of a fault diagnosis technique on aspects of an online marketplace or systems connected to the marketplace.

With respect to the overall health of the online marketplace, with the diagnosis of issue(s), the fourth aspect of the MDF, for example, may classify the marketplace with respect to the marketplace's health (e.g., error rate, effectiveness, and/or efficiency). Also, the fourth aspect, for example, may quantify risk and impact of the marketplace's health. As described herein, the MDF may then select an action (e.g., remedy), to reduce risk and impact issues associated with a health classification of the marketplace (or diagnosis of the marketplace).

The method 300 then with a fifth aspect of the MDF stores results of the execution of the appropriate fault diagnosis technique (at block 310). Further, the fifth aspect of the MDF may store an effectiveness rating of the one or more of the techniques, procedures, or measurements discovered by the first aspect. The fifth aspect may also store a fault diagnosis profile that may include a particular prioritization of the procedures of the fault diagnosis technique, for example. The profile may also include results of one or more diagnoses using the fault diagnosis technique with a particular prioritization, and other information related to the fault diagnosis technique with the particular prioritization. This other information may include effectiveness of the fault diagnosis technique with the particular prioritization. Furthermore, another aspect of the MDF may rerun a fault diagnosis technique periodically, and store the results and effectiveness ratings of one or more of the procedures of that technique to determine and track overall effectiveness of the technique through various periods of time. Also, the periodic performance of the fault diagnosis technique as well as the other aspects of the MDF may be automated with little to no operator or user interaction.

With respect to method 300, blocks 302 through 310 can be performed online, offline, or via a combination thereof. For example, 302 through 310, which results in a profile, can be performed offline.

Then, at block 312, a remedy for a diagnosed issue may be generated by a sixth aspect of the MDF, according to at least the stored results of block 310. The remedy may be generated online for example, based on the profile. The remedy may also be based on historical information related to remedying the diagnosed issue. Further, the remedy may be based on a group of the profiles. In one embodiment, multiple profiles that are related may be categorized and grouped in a categorical profile, for example. In such an embodiment, the sixth aspect may generate a remedy based on the categorical profile or an aspect of the categorical profile, for example.

Additionally, with generation of the remedy, the sixth aspect may also generate thresholds, benchmarks, and target measurements to facilitate determining progress of the remedy. For example, where a remedy has multiple stages (e.g., multiple chronological stages), the remedy may include one or more deadlines (e.g., a specific deadline or range of time for a deadline) and/or one or more measurement thresholds or benchmarks for one or more of the multiple stages.

Also, a remedy may include transition paths for guiding a marketplace from one state or condition to another state or condition. Further, a remedy may be transformed into a switch of a control system for an online marketplace, where the switch may be continuous or discrete in its control of an aspect of an online marketplace. A remedy may also include multifaceted procedures that include various switches; and such procedures may vary over time with respect to changes in market conditions and an online marketplace.

The method 300 then with a seventh aspect of the MDF executes the remedy (at block 314). For example, the remedy is executed online.

The method 300 then with an eighth aspect of the MDF analyzes the effectiveness of the remedy and stores the analysis (at block 316). The analysis of the effectiveness of the remedy may be performed offline, for example, after an evaluation of a remedied issue. The eighth aspect may also rank the remedies for a particular issue by effectiveness, for example.

Finally, the method 300 at block 318, with a ninth aspect of the MDF provides feedback with respect to the diagnosis technique and the remedy to respective aspects of the MDF (such as an analysis of an effectiveness of a remedy to the sixth aspect). Using this feedback, the sixth aspect may update its generation of that remedy. Also, the method 300 with the ninth aspect or another aspect of the MDF may provide feedback to the fifth aspect, for example. Using this feedback, the fifth aspect may update a particular profile associated with a diagnosis technique associated with the remedy. Further, besides the aforementioned feedback, the ninth aspect, for example, may provide reports and recommendations to users or operators of the MDF or an online marketplace. These reports may include information for improving the online market marketplace or remedying issues within or related to the marketplace. Such reports may include recommended remedies or further areas to investigate, for example.

Additionally, considering the abovementioned feedback and continuous running of the method 300, the MDF may generate risk profiles with respect to various states of an online marketplace over various time periods. Also, such feedback allows for the MDF to remain flexible to make adaptations with respect to changes in conditions and structure of an online marketplace.

From the foregoing, it can be seen that the present invention provides a diagnostics system for an online marketplace analogous to a system for diagnosing a patient seeking healthcare. Further, the diagnostics system, in addition or in conjunction with another system may provide remedial actions once a diagnosis is made. Further, provided is a system for deriving the diagnostics system, wherein generating and selecting procedures for the diagnostics system includes statistical modeling of the procedures to determine their effectiveness in making diagnoses.

As it can be imagined, there are various embodiments for providing and deriving the marketplace diagnostics framework described herein. It is therefore intended that the foregoing detailed description be regarded as illustrative rather than limiting, and that it be understood that it is the following claims, including all equivalents, that are intended to define the spirit and scope of this invention.

We claim:
1. A method comprising:
automatically identifying, by at least one processing unit, a fault diagnosis technique for analyzing an online marketplace, where the fault diagnosis technique comprises procedures and measurements for analyzing the online marketplace and diagnosing an issue of the online marketplace, the analyzing the online marketplace comprising analyzing the online marketplace's profitability;
automatically evaluating, by the at least one processing unit, the procedures and the measurements of the fault diagnosis technique for the procedures' and the measurements' effectiveness in analyzing the online marketplace and diagnosing an issue of the online marketplace, the evaluating comprising evaluating the effectiveness of the procedures and the measurements of the fault diagnosis technique in analyzing the profitability of the online marketplace;
automatically prioritizing, by the at least one processing unit, the procedures and the measurements of the fault diagnosis technique according to at least the evaluation of the procedures' and the measurements' effectiveness in analyzing the online marketplace, the prioritizing comprising prioritizing the procedures' and the measurements' according to their effectiveness in analyzing the profitability of the online marketplace;
executing, by the at least one processing unit, at least one of the procedures and the measurements of the fault diagnosis technique according to the prioritization of the procedures and the measurements to analyze the online marketplace including analyzing the online marketplace's profitability;
electronically storing, by the at least one processing unit, diagnostic information resulting from the execution of the at least one of the procedures and the measurements;
automatically generating, by the at least one processing unit, a remedy according to at least the diagnostic information;
executing, by the at least one processing unit, the remedy; and
automatically evaluating, by the at least one processing unit, remediation information resulting from the execution of the remedy, the evaluating comprising using the remediation information in determining whether or not to automatically update the remedy.

2. The method of claim 1, further comprising:
prior to the identification of the fault diagnosis technique, searching, by the at least one processing unit, for an appropriate fault diagnosis technique for a particular online marketplace.

3. The method of claim 1, further comprising:
storing, by the at least one processing unit, the remediation information and the evaluation of the remediation information.

4. The method of claim 1, further comprising:
communicating, by the at least one processing unit, the remediation information and the evaluation of the remediation information to an operator of the online marketplace.

5. The method of claim 1, further comprising:
communicating, by the at least one processing unit, the remediation information and the evaluation of the remediation information to another electronic device.

6. The method of claim 1, where the prioritization of the procedures and the measurements, comprises determining a most effective procedure for determining an issue of the online marketplace, and ranking the most effective procedure higher than other procedures of the fault diagnosis technique.

7. The method of claim 1, where the prioritization of the procedures and the measurements comprises determining a most effective measurement for determining an issue of the online marketplace, and ranking the most effective measurement higher than other measurements of the fault diagnosis technique.

8. The method of claim 1, where the prioritization of the procedures and the measurements, comprises determining a critical indicator for determining an issue of the online marketplace, and ranking the critical indicator higher than other indicators for determining an issue of the online marketplace.

9. The method of claim 1, where at least one of the procedures of the fault diagnosis technique comprises at least one of the measurements of the fault diagnosis technique, and where at least one of the measurements of the fault diagnosis technique comprises a measurement of an indicator for determining an issue of the online marketplace.

10. The method of claim 1, where at least one of the procedures of the fault diagnosis technique comprises statistical modeling for at least one of the measurements of the fault diagnosis technique.

11. The method of claim 1, where at least one of the procedures of the fault diagnosis technique comprises a procedure for classifying a diagnosed issue with respect to an effect of the diagnosed issue on the online marketplace.

12. The method of claim 1, where at least one of the procedures of the fault diagnosis technique comprises a procedure for classifying an overall health state of the online marketplace.

13. The method of claim 12, where the procedure for classifying the overall health state of the online marketplace comprises measuring the profitability of the online marketplace.

14. The method of claim 1, where at least one of the measurements of the fault diagnosis technique is a measurement of liquidity in the online marketplace.

15. The method of claim 1, where at least one of the measurements of the fault diagnosis technique is a measurement of demand for products and services distributed in the online marketplace.

16. The method of claim 1, where at least one of the measurements of the fault diagnosis technique is a measurement of an amount of transactions or subscriptions in a marketplace.

17. The method of claim 1, where the executing of at least one of the procedures and the measurements of the fault diagnosis technique comprises determining cause of an issue of the online marketplace.

18. The method of claim 17, where the determining the cause of an issue of the online marketplace is at least based on an evaluation of historical information.

19. The method of claim 17, where the determining the cause of an issue of the online marketplace is at least based on an evaluation of historical information, the issue, and a related issue or another marketplace.

20. A system comprising:
at least one computing device, each computing device comprising a processor and a storage medium for tangibly storing thereon program logic for execution by the processor, the stored program logic comprising:
identifying logic executed by the processor for automatically identifying a fault diagnosis technique for analyzing an online marketplace, where the fault diagnosis technique comprises measurements for analyzing the online marketplace and diagnosing an issue of the online marketplace, the analyzing the online marketplace comprising analyzing the online marketplace's profitability;
evaluating logic executed by the processor for automatically evaluating the measurements of the fault diagnosis technique for their effectiveness in analyzing the online marketplace and diagnosing an issue of the online marketplace, the evaluating comprising evaluating the effectiveness of the measurements of the fault diagnosis in analyzing the profitability of the online marketplace;
prioritizing logic executed by the processor for automatically prioritizing the measurements of the fault diagnosis technique according to at least the evaluation of the measurements' effectiveness in analyzing the online marketplace, the prioritizing comprising prioritizing according to the evaluating the measurements' according to their effectiveness in analyzing the profitability of the online marketplace;
executing logic executed by the processor for executing at least one of the measurements of the fault diagnosis technique according to the prioritization of the measurements to analyze the online marketplace including the online marketplace's profitability;
storing logic executed by the processor for electronically storing diagnostic information resulting from the execution of the at least one of the measurements;
generating logic executed by the processor for automatically generating a remedy according to at least the diagnostic information;
executing logic executed by the processor for executing the remedy; and
evaluating logic executed by the processor for automatically evaluating remediation information resulting from the execution of the remedy, the evaluating comprising using the remediation information in determining whether or not to automatically update to the remedy.

\* \* \* \* \*